United States Patent
Freitas

(10) Patent No.: US 11,397,846 B1
(45) Date of Patent: Jul. 26, 2022

(54) INTELLIGENT IDENTIFICATION AND MODIFICATION OF REFERENCES IN CONTENT

(71) Applicant: MICROSOFT TECHNOLOGY LICENSING, LLC, Redmond, WA (US)

(72) Inventor: Jesse Alexander Freitas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/314,225

(22) Filed: May 7, 2021

(51) Int. Cl.
*G06F 40/166* (2020.01)
*G06N 20/00* (2019.01)
*G06F 3/0481* (2022.01)
*G06F 40/253* (2020.01)

(52) U.S. Cl.
CPC ......... *G06F 40/166* (2020.01); *G06F 3/0481* (2013.01); *G06F 40/253* (2020.01); *G06N 20/00* (2019.01)

(58) Field of Classification Search
CPC ...... G06F 40/166; G06F 40/253; G06N 20/00
See application file for complete search history.

(56) References Cited

U.S. PATENT DOCUMENTS

| | | | | |
|---|---|---|---|---|
| 5,477,448 A | * | 12/1995 | Golding | G06F 40/253 704/9 |
| 2005/0267735 A1 | * | 12/2005 | Kharrat | G06F 40/253 704/4 |
| 2011/0313757 A1 | * | 12/2011 | Hoover | G06F 40/205 704/9 |
| 2017/0344531 A1 | * | 11/2017 | Neumann | G06F 3/0482 |
| 2019/0205372 A1 | * | 7/2019 | Li | G06N 20/00 |

FOREIGN PATENT DOCUMENTS

WO WO-2005022294 A2 * 3/2005 ............. G06F 40/56

OTHER PUBLICATIONS

Chada, R. (2019). Gendered pronoun resolution using BERT and an extractive question answering formulation. Ithaca: Cornell University Library, arXiv.org. Retrieved from https://www.proquest.com/working-papers/gendered-pronoun-resolution-using-bert-extractive/docview/2238252029/se-2?accountid=14753.*
Zhuang, Fuzhen, et al. "A comprehensive survey on transfer learning." Proceedings of the IEEE 109.1 (2020): 43-76.*
"Non Provisional Application Filed in U.S. Appl. No. 17/121,236", filed Dec. 14, 2020, 36 Pages.
Joshi, et al., "BERT for Coreference Resolution: Baselines and Analysis", In Proceedings of the Conference on Empirical Methods in Natural Language Processing and the 9th International Joint Conference on Natural Language Processing, Nov. 3, 2019, pp. 5803-5808.

* cited by examiner

*Primary Examiner* — Asher D Kells
(74) *Attorney, Agent, or Firm* — NovoTechIP International PLLC

(57) ABSTRACT

A method and system for providing improper reference identification for a content segment may include receiving a request to identify an improper reference in the content segment, inputting the content segment into a machine-learning (ML) model to identify the improper reference in the content segment, obtaining the identified improper reference as a first output from the ML model, obtaining one or more suggested replacement references as a second output from the ML model, and providing at least one of the identified improper reference or the at least one of the one or more suggested replacements for display.

19 Claims, 11 Drawing Sheets

US 11,397,846 B1

INTELLIGENT IDENTIFICATION AND MODIFICATION OF REFERENCES IN CONTENT

TECHNICAL FIELD

This disclosure relates generally to intelligent identification of references in content, and, more particularly, to a method of and system for intelligently detecting accuracy, consistency and/or clarity in use of references in content.

BACKGROUND

Users of computing devices often use various content creation applications to create textual content. For example, users may utilize an application to write an email, prepare an essay, document their work, prepare a presentation and the like. Proper use of references in content is important for creating unambiguous and accurate content. However, it is not always easy for users to detect incorrect and/or ambiguous references in their content. For example, the user may not detect that a pronoun used in their content does not clearly convey the person to whom it refers. At other times, the user may use an incorrect pronoun for an individual. This may cause offense or lead to embarrassment for both the writer and/or the individual they referred to.

Furthermore, detecting inappropriate references in content may require a detailed examination of the content and/or access to additional information. This may be time consuming, require a certain level of content editing proficiency, and difficult to perform.

Hence, there is a need for improved systems and methods of intelligent detection and modification of references in content.

SUMMARY

In one general aspect, the instant disclosure describes a data processing system having a processor and a memory in communication with the processor wherein the memory stores executable instructions that, when executed by the processor, cause the data processing system to perform multiple functions. The functions may receiving a request to identify an improper reference in a content segment, inputting the content segment into a machine-learning (ML) model to identify the improper reference in the content segment, obtaining the identified improper reference as a first output from the ML model, obtaining one or more suggested replacement references as a second output from the ML model, and providing at least one of the identified improper reference or the at least one of the one or more suggested replacements for display.

In yet another general aspect, the instant disclosure describes a method for providing improper reference identification for a content segment. The method may include receiving a request to identify an improper reference in the content segment, inputting the content segment into a ML model to identify the improper reference in the content segment, obtaining the identified improper reference as a first output from the ML model, obtaining one or more suggested replacement references as a second output from the ML model, and providing at least one of the identified improper reference or the at least one of the one or more suggested replacements for display.

In a further general aspect, the instant disclosure describes a non-transitory computer readable medium on which are stored instructions that when executed cause a programmable device to receive a request to identify an improper reference in a content segment, input the content segment into a ML model to identify the improper reference in the content segment, obtain the identified improper reference as a first output from the ML model, obtain one or more suggested replacement references as a second output from the ML model, and provide at least one of the identified improper reference or the at least one of the one or more suggested replacements for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
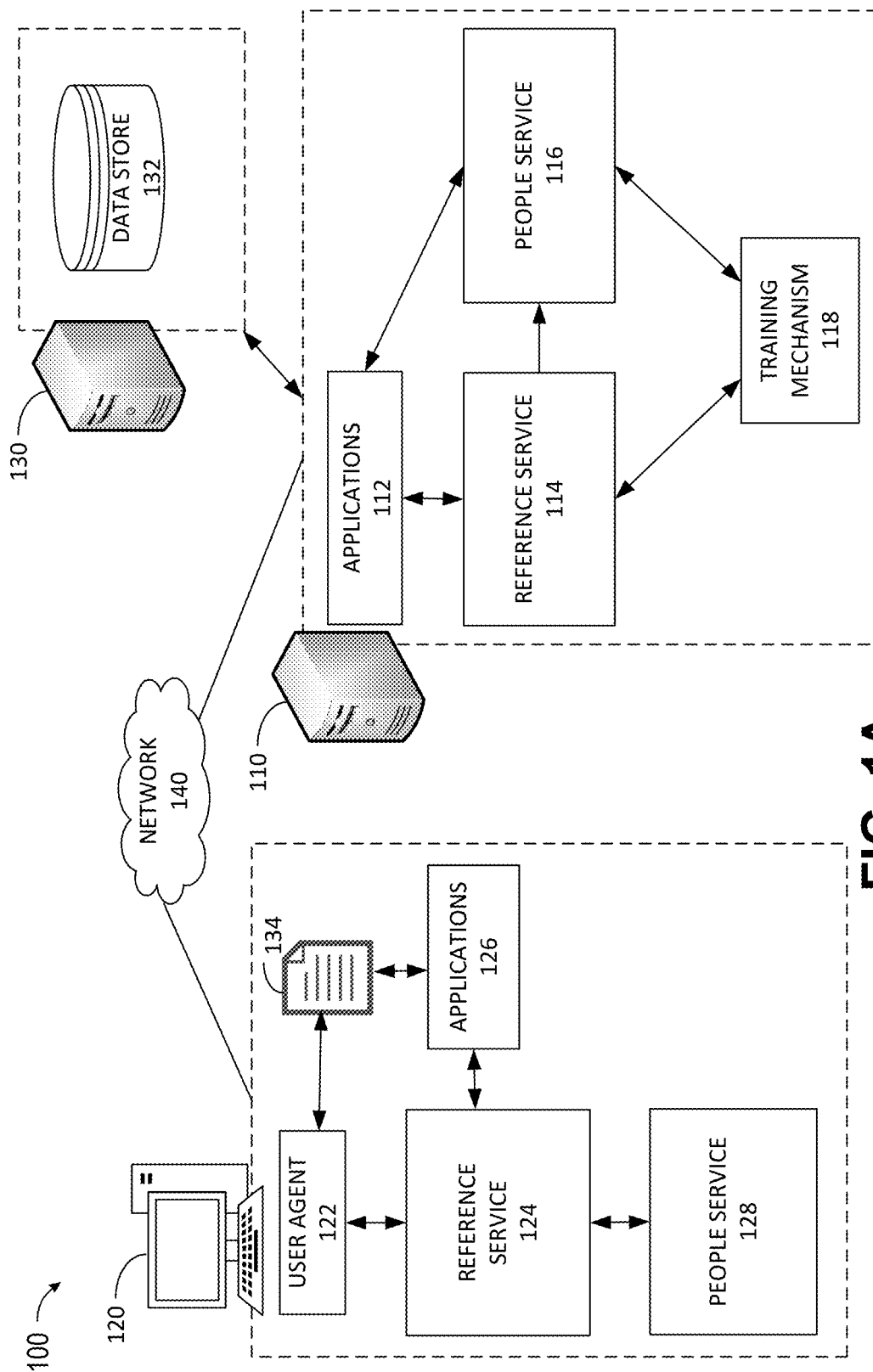
FIG. 1A-1C depict an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In today's fast-paced environment, users of computing devices often create many different types of digital content on a given day. These may include email messages, instant messages, presentations, word documents, social media posts and others. Sometimes, there is not enough time to review the content carefully before it is shared with others. This may be particularly the case with email or instant messages. As a result, users may not recognize that some of the references used in their content are ambiguous or incorrect. Other times, even though a user has time to review his/her content, they may not detect an incorrect pronoun or an ambiguous reference. Moreover, the user may not be able to identify inconsistencies in the references used. Furthermore, reviewing and rewriting the content may take a lot of time and effort.

Some currently used applications offer computer-based review and/or rephrasing of content. However, these currently used reviewing and rephrasing mechanisms often have the technical problem of being limited to reviewing of grammar and/or typographical errors. Thus, if a user relies on the currently available mechanisms for reviewing and rephrasing their content, they are not likely to detect an improper reference. Furthermore, the available mechanisms are not able to offer any assistance to users on using appropriate references. Thus, there exists a technical problem of inability of current applications to detect improper references and/or assist users in utilizing proper references.

To address these technical problems and more, in an example, this description provides a technical solution used for intelligently detecting improper references in content and providing suggestions for changing the references to proper ones. To do so, techniques may be used to examine content (e.g., written or spoken content), parse the content into one or more segments (e.g., sentences and/or phrases), examine each of the segments to identify the references in the content, determine if any of the references are improper, and suggest alternative references. The references may be identified by utilizing one or more machine-learning (ML) models that are trained to detect references in content. Once a reference is identified, one or more ML models may be utilized to compare the reference to other references in the content and/or utilize contextual information to determine if the reference is appropriate. When a reference is identified as being inappropriate (e.g., incorrect, ambiguous or inconsistent), one or more ML models may be utilized to provide suggestions for proper references to use. The contextual information may include context, formatting and/or other characteristics of the document, in addition to user-specific history and information, and/or non-linguistic features. In one implementation, the suggested references are displayed in a user interface (UI) element alongside the content to enable the user to view and choose from them conveniently. Additionally, techniques may be used to receive feedback from the user and utilize the feedback to improve ML models used to identify references and/or provide suggested references. The feedback may be explicit, for example, when a user chooses to report a detected reference as incorrect and/or a suggestion as inaccurate. Furthermore, feedback may be obtained as part of the process based on user interaction with the identified references and/or selection of the suggested references. This type of feedback may be anonymized and processed to ensure it is privacy compliant. As a result, the technical solution provides an improved method of reviewing content and identifying improper references. Furthermore, the technical solution provides suggestions for replacing the identified reference with an appropriate one by allowing a user to easily and quickly select intelligently suggested references.

As will be understood by persons of skill in the art upon reading this disclosure, benefits and advantages provided by such implementations can include, but are not limited to, a technical solution to the technical problems of inefficient, inadequate, and/or inaccurate review and/or rewrite suggestion mechanisms. Technical solutions and implementations provided herein optimize the process of identifying improper references in content, providing suggestions for appropriate references to use, and by offering easily accessible UI element(s) which contain intelligently suggested references. This may eliminate the need for the user to carefully review content for not only grammar and spelling, but also for proper use of references. The benefits provided by these technology-based solutions yield more user-friendly applications, improved communications and increased system and user efficiency.

As used herein, the term "content" may refer to written or spoken content and may include textual content, audio input and content of a digital document. Furthermore, as used herein, the term "document" may refer to any file that can be created via an application executing on a computing device. The term "reference" may be used to describe to a word that refers to an entity, object, person and/or another word in the document (e.g., pronouns, subject in a sentence, etc.). In an example, the term "reference" refers to noun phrases.

FIG. 1A illustrates an example system 100, upon which aspects of this disclosure may be implemented. The system 100 may include a server 110 which may include and/or execute a reference service 114 and a people service 116. The server 110 may operate as a shared resource server located at an enterprise accessible by various computer client devices such as client device 120. The server may also operate as a cloud-based server for offering global reference and people services. Although shown as one server, the server 110 may represent multiple servers for performing various different operations. For example, the server 110 may include one or more processing servers for performing the operations of the reference service 114 and the people service 116.

The reference service 114 may provide intelligent reference identification and suggestion. The reference service 114 may operate to examine content, parse the content into one or more segments when needed, and to identify one or more references contained in the segment. Once a reference is identified in a segment, the reference service 114 may determine if the reference is an appropriate reference. When an inappropriate reference is identified, the reference service 114 may identify and provide suggestions for appropriate reference(s) that can replace the inappropriate reference. The reference service 114 may be provided by one or more reference ML models, as further discussed below with regards to FIG. 1B.

The people service 116 may provide intelligent information about individuals. The people service 116 may be provided within an enterprise and/or globally for a group of users. The people service 116 may operate to receive a request for a pronoun for an individual, examine user data and/or contextual information to identify the proper pronoun for the individual, and provide the proper pronoun for use. The people service 116 may be provided by one or more ML models, as further discussed below with regards to FIG. 1B.

As a general matter, the methods and systems described herein may include, or otherwise make use of, a machine-trained model to identify contents related to a text. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity and/or determine associations between various words, reference and/or pronouns. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate detection of improper references and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The ML model trainer may be pretrained ML model. The generation of ML models may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

The server 110 may be connected to or include a storage server 130 containing a data store 132. The data store 132 may function as a repository in which documents, data sets (e.g., training data sets), and/or user data may be stored. One or more ML models used by the reference service 114 and/or the people service 116 may be trained by a training mechanism 118. The training mechanism 118 may use training data sets stored in the data store 132 to provide initial and ongoing training for each of the models. Alternatively or additionally, the training mechanism 118 may use training data sets unrelated to the data store 132. This may include training data such as knowledge from public repositories (e.g., Internet), knowledge from other enterprise sources, or knowledge from other pretrained mechanisms (e.g., pretrained models). In one implementation, the training mechanism 118 may use labeled training data from the data store 132 to train one or more of the ML models via deep neural network(s) or other types of ML algorithms. Alternatively or additionally, the training mechanism 118 may use unlabeled training data. The initial training may be performed in an offline stage or may be performed online. Additionally and/or alternatively, the one or more ML models may be trained using batch learning.

It should be noted that the ML model(s) identifying references and/or determining proper pronouns may be hosted locally on the client device 120 or remotely, e.g., in the cloud. In one implementation, some ML models are hosted locally, while others are stored remotely. This may enable the client device 120 to provide some improper reference identification and modification even when the client device 120 is not connected to a network.

The server 110 may also include or be connected to one or more online applications 112 that allow a user to interactively view, generate and/or edit digital content. Examples of suitable applications include, but are not limited to a word processing application, a presentation application, a note taking application, a text editing application, an email application, an instant messaging application, a communications application, a web-browsing application, a collaboration application, and a desktop publishing application.

The client device 120 may be connected to the server 110 via a network 140. The network 140 may be a wired or wireless network(s) or a combination of wired and wireless networks that connect one or more elements of the system 100. The client device 120 may be a personal or handheld computing device having or being connected to input/output elements that enable a user to interact with digital content such as content of an electronic document 134 on the client device 120. Examples of suitable client devices 120 include but are not limited to personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 6 and 7.

The client device 120 may include one or more applications 126. Each application 126 may be a computer program executed on the client device that configures the device to be responsive to user input to allow a user to interactively view, generate and/or edit digital content such as content within the electronic document 134. The electronic document 134 can include any type of data, such as text (e.g., alphabets, numbers, symbols), emoticons, still images, video and audio. Examples of documents include but are not limited to word-processing documents, presentations, notebooks, email messages, instant messages, websites (e.g., SharePoint sites), media files and the like. The electronic document 134 may be stored locally on the client device 120, stored in the data store 132 or stored in a different data store and/or server.

The application 126 may process the electronic document 134, in response to user input through an input device, to create and/or modify the content of the electronic document 134, by displaying or otherwise presenting display data, such as a GUI which includes the content of the electronic document 134 to the user. Examples of suitable applications include, but are not limited to a word processing application, a presentation application, a note taking application, a text editing application, an email application, an instant messaging application, a communications application, a web-browsing application, a collaboration application and a desktop publishing application.

The client device 120 may also access applications 112 that are run on the server 110 and provided via an online service as described above. In one implementation, applications 112 communicate via the network 140 with a user agent 122, such as a browser, which is executed on the client device 120. The user agent 122 may provide a UI that allows the user to interact with application content and electronic documents stored in the data store 132 or locally on the client device 120. The UI may be displayed on a display device of the client device 120 by utilizing for example the user agent 122. In some examples, the user agent 122 may be a dedicated client application that provides a UI and access to electronic documents stored in the data store 132. In other examples, applications used to create, modify and/or view digital content such as content of electronic documents maybe local applications such as the applications 126 that are stored and executed on the client device 120, and provide a UI that allows the user to interact with application content and electronic document 134. In some implementations, the user agent 122 may include a browser plugin that provides access to reference identification and modification services for content created via the user agent (e.g., content created on the web such as social media posts and the like).

In one implementation, the client device 120 may also include a local reference service 124 for providing intelligent identification and modification of improper references in content. For example, local reference service 124 may provide identification and modification of improper references content in documents, such as the document 134. The client device 120 may also include a local people service 128 for determining proper pronouns for one or more individuals referenced in content. In an example, the local reference service 124 and local people service 128 may operate with the applications 126 to provide local reference identification and modification services. For example, when the client device 120 is offline, the local reference identification and/or modification services may make use of one or more local repositories to identify improper references and/or provide alternative suggestions. In one implementation, enterprise-based repositories that are cached locally may also be used to provide local reference identification and/or modification.

It should be noted that each of the reference service 114, people service 116, local reference service 124 and local people service 128 may be implemented as software, hardware, or combinations thereof.

Figure 1B:
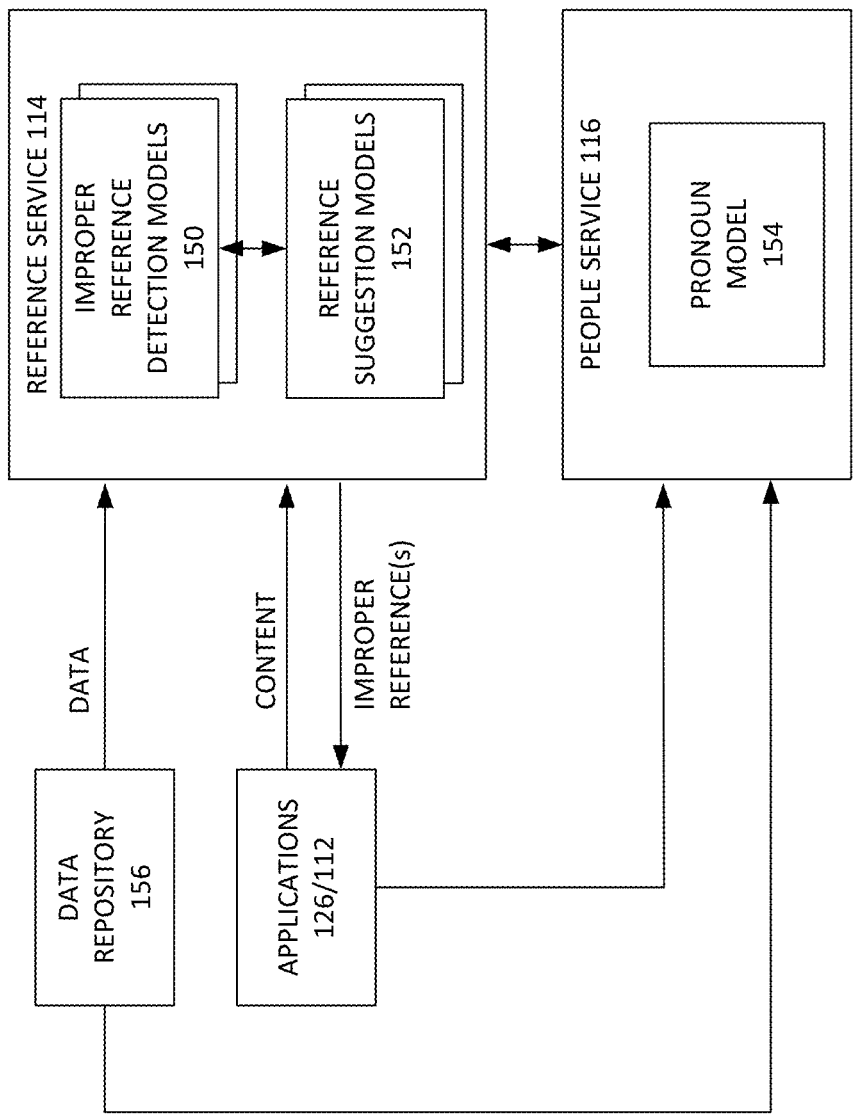

FIG. 1B depicts a system level data flow between some of the elements of system 100. As discussed above, content being viewed, edited or created by one or more applications 126 and/or online applications 112 may be transmitted to the reference service 114 to identify one or more improper references in one or more segments of the content. In some implementations, content transmitted to the reference service 114 may include those created via the user agent 122 (shown in FIG. 1A). For example, the content may originate from a website the enables the user to write a post. In such instances, the content may be transmitted from the user agent 122 to the reference service 114. The content may be transmitted upon a user request. For example, when the user utilizes an input/output device (e.g., a mouse) coupled to the client device 120 to invoke a UI option requesting a review of references in a content segment, the content segment may be transmitted along with the request for review of references. Alternatively, the content may be transmitted without direct user request in some applications (e.g., email applications or instant messaging applications) to enable automatic notification of improper references. For example, some applications may automatically submit a request for reference identification and/or modification when a user begins creating content (e.g., when the user finishes writing a sentence).

In addition to the content, the request for reference identification and/or modification may include other information that can be used to identify improper references and/or provide suggestions. This may include information about the application used for content creation, contextual information about the document from which the content originates, information about the user creating the content and/or other relevant information. For example, information about the type of document (e.g., word document, email, presentation document, etc.), the topic of the document, the position of the user within an organization (e.g., the user's job title or department to which the user belongs, if known), other non-linguistic features such as the person to whom the document is directed, and the like may be transmitted with the reference identification and/or modification request. In some implementations, some of the information transmitted with the request may be transmitted from a data repository 156. The data repository 156 may contain user-specific data about the user. For example, it may contain user profile data (e.g., the user's job title, various profiles within which the user creates content such as work profile, blogger profile, social media profile and the like) and/or user history data (e.g., the user's writing style, preferred tone, and the like). The user-specific data may include data about individuals' pronouns and/or titles. This may be information that is provided by users. For example, an option may be provided to users to select a pronoun and/or title (e.g., he, she, they, Mr. Ms., Dr., and the like) when setting up a user profile or account. In an example, the option is provided by an application such as applications 126 and/or 112. In another example, the option is offered by a service provider (e.g., Microsoft® as part of Office 365®). The data contained in the data repository 156 may be provided as an input directly from the data repository 156 or it may be retrieved by applications 126 and/or online applications 112 and transmitted from them.

The content transmitted for reference identification and/or modification may include one or more segments. For example, the content may include multiple sentences (e.g., a paragraph or an entire document). When the transmitted content includes more than one sentence, the reference service 114 may utilize a parsing engine (not shown) to parse the content into one or more smaller segments. In some implementations, this involves parsing the content into individual sentences, where each sentence constitutes one segment for reference identification. Alternatively, parsing may be performed by one or more of the ML models.

The parsed segments and/or unparsed content may be transmitted to one or more improper reference detection models 150 for identifying references in the content and/or determining the relationship between the references. This may be achieved by utilizing a plurality of trained improper reference detection models 150. Each improper reference detection model may be an ML trained for detecting a specific type of improper reference. For example, there may be an improper reference detection model for detecting ambiguous references, one for detecting incorrect pronouns and/or titles, and another for detecting inconsistent references. In some implementations, a single improper reference detection model is used for detecting different types of improper references.

In some implementations, one or more of the improper reference detection models 150 are trained using pretrained natural language processing models. In an example, the improper reference detection models 150 utilize a pretrained Bidirectional Encoder Representations from Transformers (BERT) base model. Alternatively, the improper reference detection models 150 may utilize a pretrained SpanBERT-base, BERT-large, or SpanBERT-large model. In another example, a large language model such as a Generative Pre-trained Transformer 3 (GPT-3) or Turing model may be used to achieve better performance. These models are known in the art.

The improper reference detection models 150 may examine the received content (e.g., a text segment) to identify words or phrases in the content that are references. References may include pronouns (e.g., subjective or objective pronouns), names (e.g., phrases used to refer back to nouns), titles, and the like. Once references in the content are identified, the improper reference detection models 150 may examine the references to ensure the correct pronoun is used to refer to a person or entity (e.g., an item is not referred as she or a person that identifies as a she is not referred as he), references are used in a consistent manner in the content (e.g., if Microsoft® is used throughout the document, use of MS is inconsistent), use of a reference is not ambiguous (e.g., it is not clear what noun a pronoun refers to), and/or the type of reference used is consistent with the tone of the document. Once a reference is detected as not complying with one or more of the above requirements, it may be identified as an improper reference. In some implementations, the improper reference detection models 150 may provide a confidence score associated with each identified improper reference. The confidence score may indicate the level of confidence associated with the reference being improper. As such, the confidence score may be used to determine which one(s) of the identified improper references should be provided to the user. Thus, each improper reference detection model 150 may receive as an input the one or more content segments and/or the data related to the user, application, document and the like, and may provide as an output a list of one or more improper references along with a confidence score for each identified improper reference.

Once the improper references are identified, they may be transmitted to one or more reference suggestion models 152. The reference suggestion models 152 may examine the identified improper reference(s) and provide suggestions for replacing the improper reference(s) with appropriate ones. This may include examining an improper reference, determining if the reference is ambiguous, incorrect or inconsistent, and then identifying one or more proper references that can be used to replace the improper reference. The process may include identifying a reference that is used consistently through the content, identifying nouns to which a pronoun may be referring (e.g., when use of the pronoun is ambiguous), and/or identifying a correct pronoun or title for a person or entity. Similar to the improper reference detection models 150, the reference suggestion models 152 may provide a confidence score with one or more of the identified proper references. In some implementations, identified proper references that meet or exceed a predetermine confidence score may be provided as an output. Alternatively and/or additionally, the reference suggestion models 152 may provide a list of suggested references along with their confidence score and other elements of the system (e.g., applications 126/112) may select the suggested references to display to the user. Thus, the suggestion models 152 may receive identified improper references, content segment and/or additional data (e.g., contextual or user data) as input and provide one or more suggested replacement references for one or more of the identified improper references as output. The output may be provided to the applications 126/112, where they are used to provide display data to the user to notify the user of the identified improper references and/or suggested replacements. Although shown as two different models, the improper reference detection models 150 and the reference suggestion models 152 may be combined and provided by one model.

In some implementations, to identify improper pronouns and/or provide suggested replacements for the identified improper pronouns, the reference service 114 may cooperate with the people service 116. The people service 116 may be service that provides various types of information about one or more people. This may include employees of an enterprise, a person's contacts and the like.

The people service 116 may include a pronoun model 154 for intelligently identifying the proper pronouns for individuals for which it has information. To achieve this, the pronoun model 154 may receive a request for identifying a pronoun for a specific person. The request may include information that identifies the specific person. For example, it may include the person's name, an alias (e.g., email address), an enterprise or team their associated with (e.g., employee of an enterprise or belonging to a certain team in an enterprise) and a user identification parameter (e.g., a user ID). This information may be retrieved directly from the content and/or it may be inferred from the content. For example, if the content is from an email message, the content includes a reference to Mark, and one of the email addresses listed in the "To" line is associated with Mark Brown, the reference service 114 may infer that the reference to Mark refers to Mark Brown. This information along with the email address may be provided to pronoun model 154 as an input to help the pronoun model 154 identify the correct person.

The information about the person to whom a reference is made in the content may then be used by the pronoun model 154 to examine user data (e.g., profile or account data) to determine if the user has provided their pronoun and/or title. When the user has provided a pronoun and/or title and has provided permission for the use of the pronoun and/or title, this information may be provided to the reference service 114 as an output. When a user pronoun and/or title cannot be found, and/or the user has not provided permission for its use, the pronoun model 154 may retrieve contextual data associated with the person and/or document to identify a proper pronoun or title for the specific person. This may be achieved by, for example, examining the person's signature in their email messages to determine if a pronoun is mentioned in the signature. Furthermore, the proper pronoun may be determined based on examining user history data. For example, the person's previous writing and/or writing from people associated with the person may be examined to determine how the person or people closely associated with the person refer to the person. In doing this, the pronoun model 154 may also calculate a confidence score associated with an identified pronoun for the person. In some implementations, the confidence score is required to meet a high threshold to ensure that an improperly identified pronoun is not suggested for a person. Thus, the pronoun model 154 may receive a request for identifying a proper pronoun for a person along with information about the person as an input and provide an identified pronoun as an output.

It should be noted a that the local reference service 124 of the client device 120 (in FIG. 1A) may include similar elements and may function similarly as the reference service 114 (as depicted in FIG. 1B). Furthermore, the local people service 128 of the client device 120 (in FIG. 1A) may include similar elements and may function similarly as the people service 116 (as depicted in FIG. 1B).

Figure 1C:
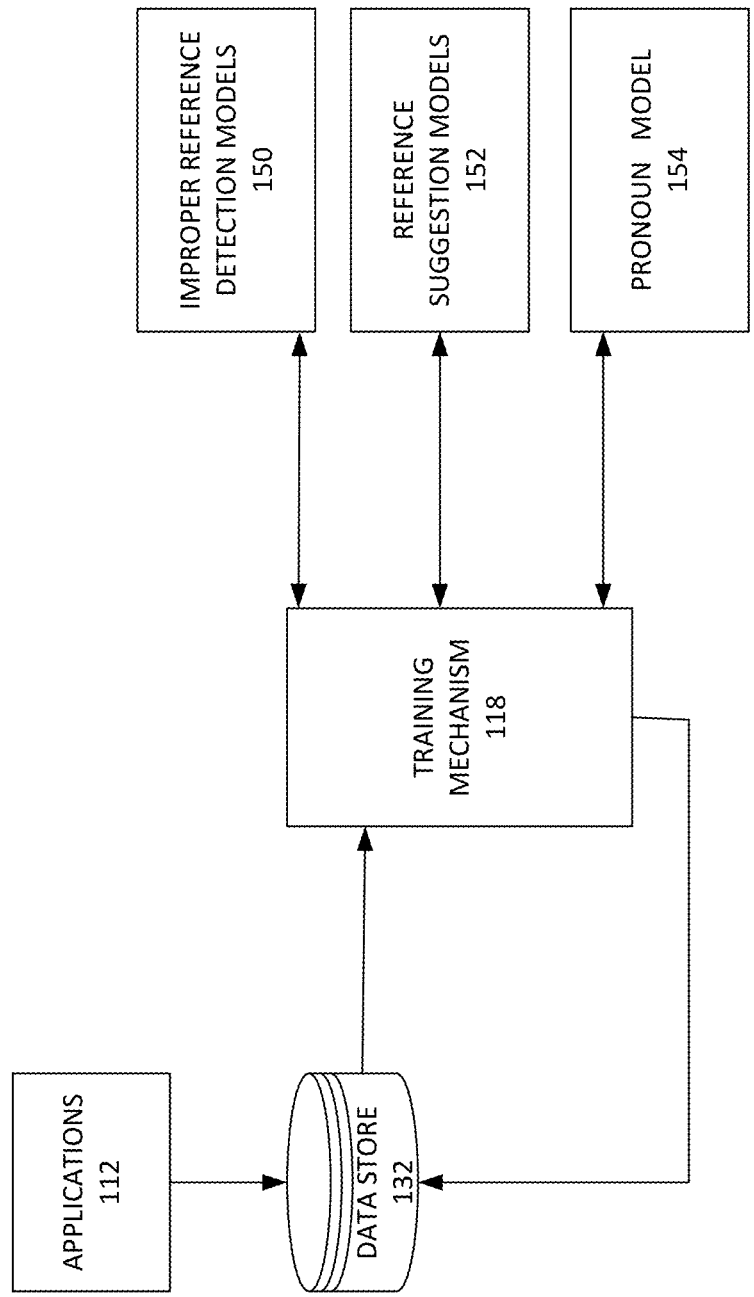

FIG. 1C depicts how one or more ML models used by the reference service 114 and the people service 116 may be trained by using the training mechanism 118. The training mechanism 118 may use training data sets stored in the data store 132 to provide initial and ongoing training for each of the models included in the reference service 114 and the people service 116. For example, each of the improper reference detection models 150, reference suggestion models 152 and pronoun model 154 may be trained by the training mechanism 118 using corresponding data sets from the data store 132.

The improper reference detection models 150 may be trained by utilizing a pretrained reference identification model such as a BERT model and training the pretrained model to identify ambiguous, inconsistent and/or incorrect references. This may be done by utilizing a labeled training data set. The training data set may utilize publicly available training data (e.g., Wikipedia data) or anonymized user collected data. The labeling process may be performed by a number of users.

The reference suggestion models 152 may be similarly trained using a pretrained model and trained via a supervised learning process by using labeled data. The pronoun model 154 may also be trained using a supervised learning process that utilizes labeled training data.

To provide ongoing training, the training mechanism 118 may also use training data sets received from each of the trained ML models (models included in the reference service 114 and the people service 116). Furthermore, data may be provided from the training mechanism 118 to the data store 132 to update one or more of the training data sets in order to provide updated and ongoing training. Additionally, the training mechanism 118 may receive training data such as knowledge from public repositories (e.g., Internet), knowledge from other enterprise sources, or knowledge from other pre-trained mechanisms.

Figure 2A:
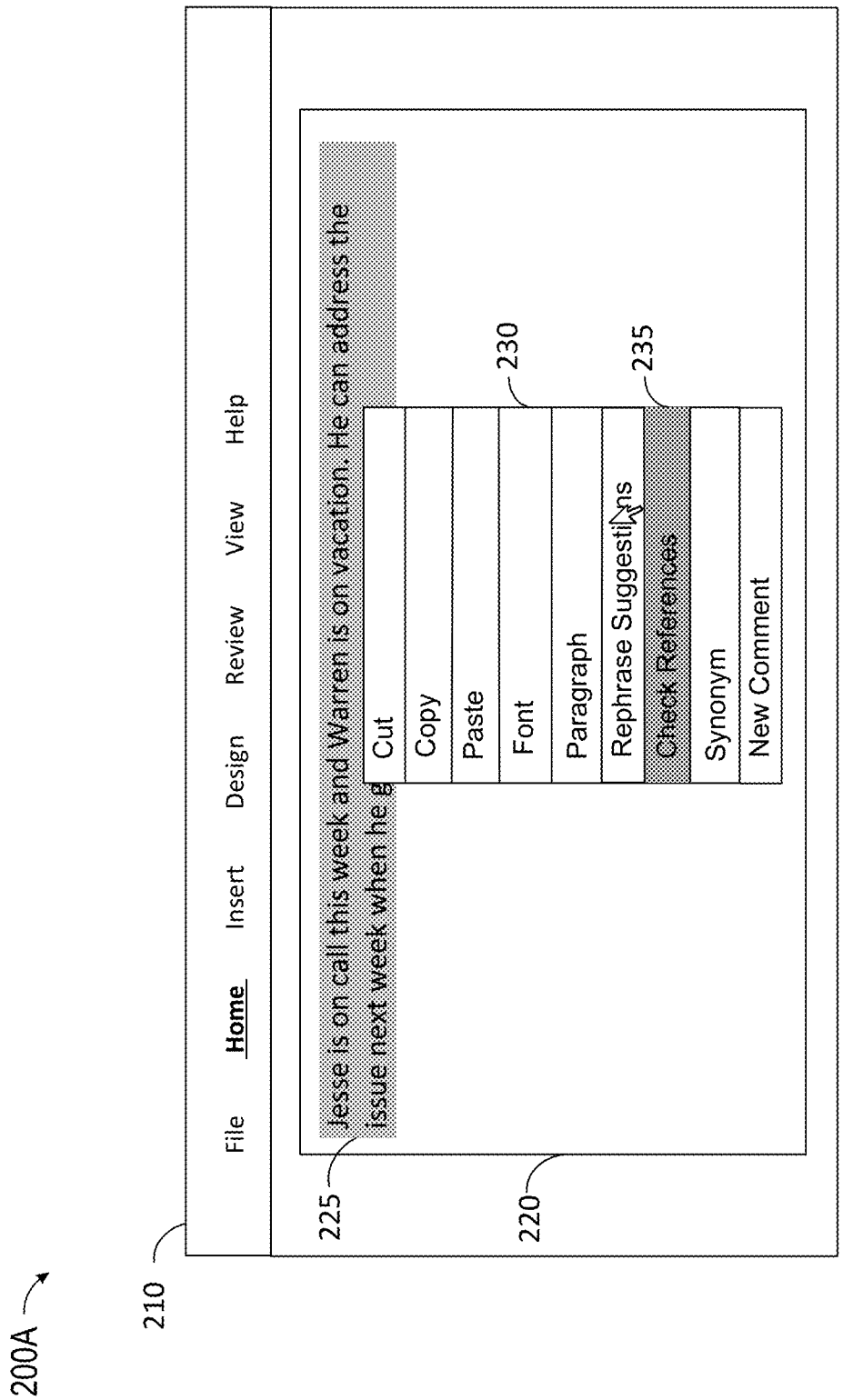
FIGS. 2A-2B are example graphical user interface (GUI) screens for allowing a user to request and receive identification of improper references and replacement suggestions.
Figure 2B:
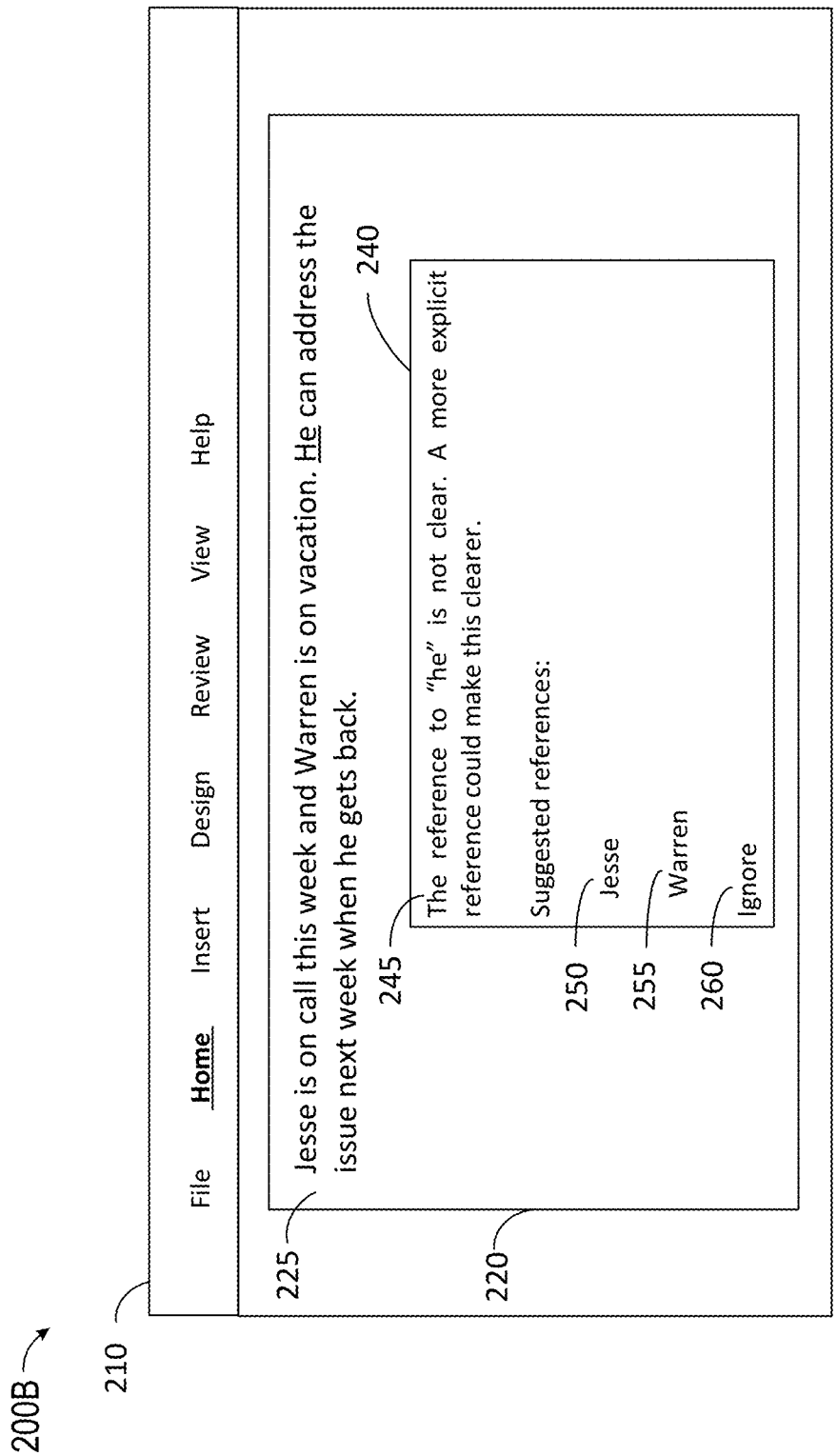

FIG. 2A-2B are example GUI screens for allowing a user to request and receive identification of improper references and replacement suggestions. FIG. 2A is an example GUI screen 200A of a word processing application (e.g., Microsoft Word®) displaying an example document. GUI screen 200A may include a toolbar menu 210 containing various tabs each of which may provide multiple UI elements for performing various tasks. For example, the toolbar menu 210 may provide options for the user to perform one or more tasks to create or edit the document. Screen 200A may also contain a content pane 220 for displaying the content of the document. The content may be displayed to the user for viewing and/or editing purposes and may be created by the user. For example, the user may utilize an input device (e.g., a keyboard) to insert input such as text into the contents pane 220.

As the user creates or edits the contents of the content pane 220, a UI element may be provided for transmitting a request to check the references in selected segment of the content. A selected text segment can be any portion of the contents of the document and may include one or more words, sentences or paragraphs. The textual contents may include any type of alphanumerical text (e.g., words and numbers in one or more languages). The text segment may also include a text having no content and thus having zero length. In one implementation, a text segment may also include known symbols, emoticons, gifs, animations, and the like. The UI element may be any menu option that can be used to indicate a request by the user. In one implementation, the UI element is provided via the context menu 230. When the user utilizes an input/output device such as a mouse to select a portion of the content such as the portion 225, certain user inputs (e.g., right clicking the mouse) may result in the display of the context menu 230. It should be noted that this is only an example method of initiating the display of UI element for invoking improper reference identification and/or replacement suggestion. Many other methods of selecting a portion of the content and initiating the display of a UI element for invoking improper reference identification and/or replacement suggestion are possible. For example, a menu option may be provided as part of the toolbar 210 for invoking improper reference identification and/or replacement suggestion for selected text segments. In some implementations, a menu option in the toolbar 210 can be used to invoking improper reference identification and/or replacement suggestion for the entire content of the content pane without selecting a content segment.

Along with a variety of different options for editing the document, the context menu 230 may provide a menu option 235 for invoking improper reference identification and/or replacement suggestion for the selected text segment 225. Once menu option 235 is selected, the application may run a local reference service or may send a request to a cloud-based reference service to provide a list of identified improper references for the selected segment. Once an improper reference is identified, a UI element, such as the UI element 240 displayed in UI screen 200B of FIG. 2B, may be displayed on the contents pane 220 to display identified improper references and/or provide replacement reference suggestions for the selected text segment.

The UI element 240 may provide an explanation such as the description 245 that identifies an identified ambiguous reference, explains why the reference is ambiguous and/or provides a reason for the suggested reference being more appropriate. For example, because the first sentence in the selected text segment 225 includes two nouns, Jesse and Warren, the reference to he in the second sentence is unclear. The explanation 245 identifies the ambiguous reference and explains that the reference is not clear. In some implementations, the identified reference is also identified within the text segment. For example, as displayed in the content pane 220, the word "he" which is identified as an ambiguous reference is temporarily underlined to identify it. Other methods of identifying the improper/ambiguous reference within the text may be utilized. For example, the identified reference may be highlighted, bolded, shown in a different color and the like.

In addition to displaying the explanation 245, the UI element 240 may also present a list of suggested references for replacing the identified reference. The list of suggested references in screen 200B includes a first suggestion 250 and a second suggestion 255. The user may be able to automatically replace the identified improper reference by selecting one of the suggested references (e.g., by clicking on one of the suggested references). Alternatively, the user may be able to choose to ignore the warning by selecting an ignore UI element 260. Selecting the ignore UI element 260 may result in disappearance of the UI element 240 as well as disappearance of the indication identifying the improper reference within the text. In some implementations, data about the user's selection or disregard of a suggested reference may be collected and stored for use in ongoing training of the ML models used for identifying improper references and/or providing reference suggestions. When more than one improper reference is identified in a selected text portion, a UI element such as scroll button or arrows for moving between the different identified improper references may be provided on the UI element 240.

In some implementations, the UI element 240 is displayed adjacent to the context menu 230 of FIG. 2A. In another example, the identified improper references and/or suggested replacement references may be displayed in separate pane. For example, a reference pane may be displayed adjacent to the content pane 220 for displaying the identified improper references and/or suggested replacement references. Many other UI configurations for displaying the identified improper references and/or suggested replacement references are contemplated.

Figure 3A:
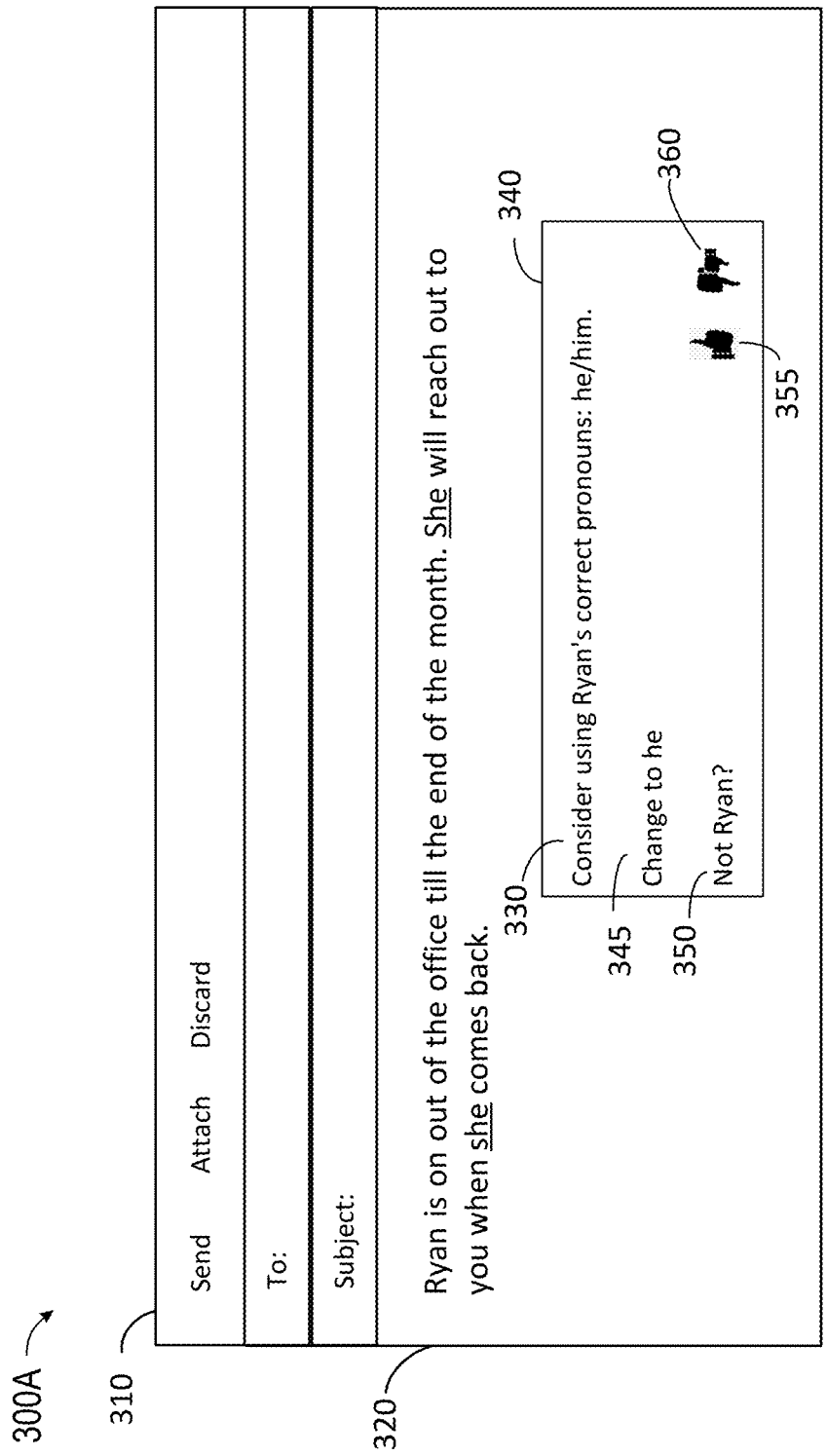
FIGS. 3A-3B are example GUIs for automatically providing improper reference identification and/or suggested replacement references.
Figure 3B:
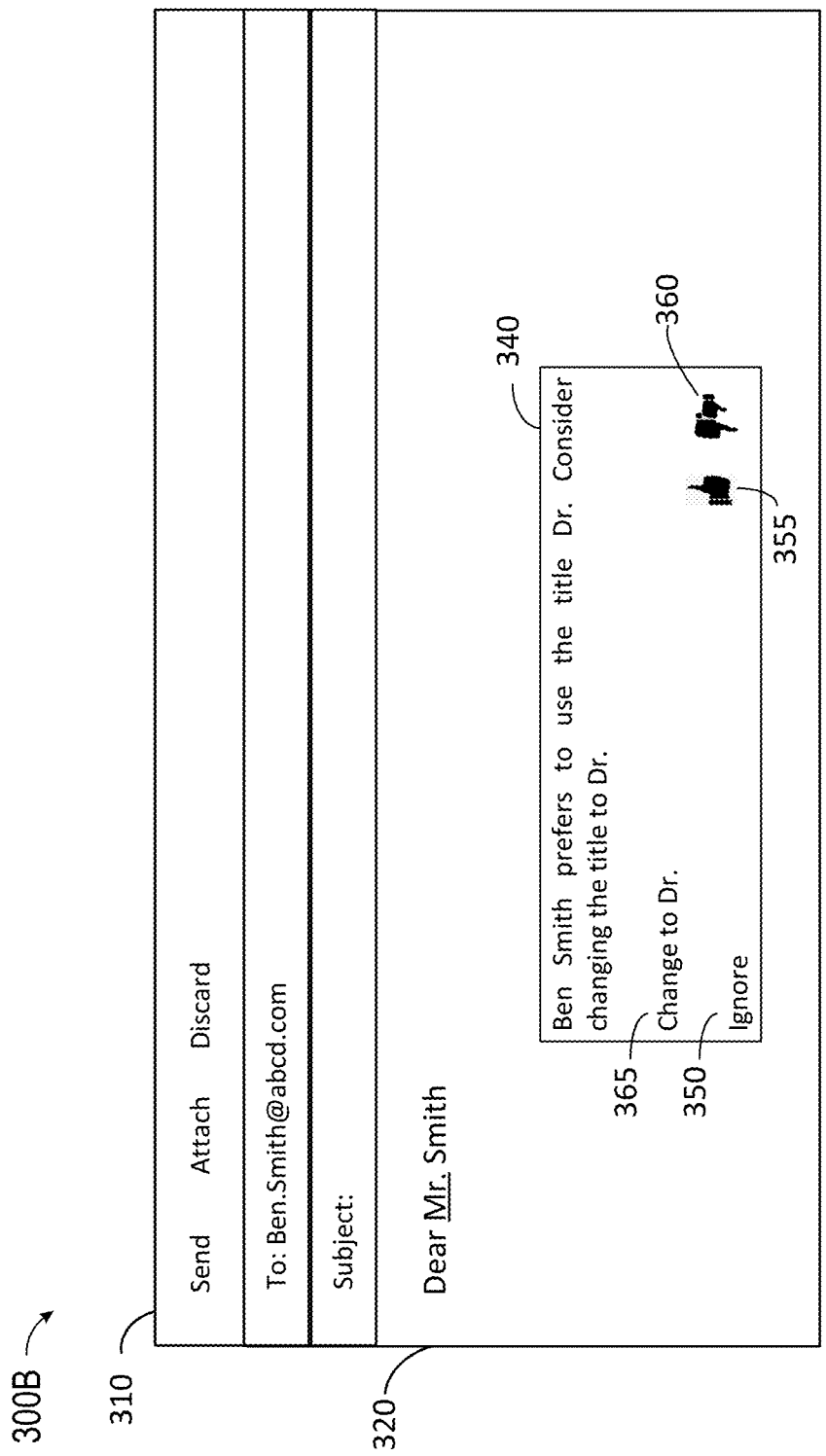

In addition to enabling the user to request improper reference identification, in some implementations, improper references may be detected automatically (e.g., in the background) and once an improper reference is detected, the user may be notified even if the user has not initiated a request for improper reference identification. FIGS. 3A-3B are example GUI screens for automatically providing improper reference identification and/or suggested replacement references. Screen 300A of FIG. 3A depicts a UI element 310 of a communication application such as an email application. The UI element includes a content pane 320 of a draft email message being created. In some implementations, for content such as email messages, instant messages, web postings and the like, where the content the user is creating relates to communications with one or more other individuals, the content creation application and/or web browser plugin may function to automatically perform improper reference identification. This may be done to warn the user of improper references that may be disrespectful or otherwise improper when the user is communicating with others. In some implementations, automatic improper reference detection and replacement suggestion may be done by first determining when a text segment is complete (e.g., when a sentence is complete) and then submitting the completed text segment for improper reference detection and replacement suggestion upon its completion. Alternatively and/or additionally, automatic improper reference detection may be performed once a determination is made that content creation is complete (e.g., the user's name at the end of the email message).

Once a text segment is submitted for improper reference detection and replacement suggestion, a reference service (e.g., the local reference service 124 or reference service 114 of FIGS. 1A-1C) and/or people service (e.g., people service 116 or local people service 128) may be utilized to identify improper references in the content. As discussed above, this may involve identifying the individuals referred to in the content, determining if they have specified pronouns for use and/or identifying a pronoun for them, and determining if the pronouns used in the content for the individuals are consistent with the specified or identified pronouns.

When an improper reference within the content is detected, one or more notification mechanisms may be employed to notify the user of the improper reference. For example, as depicted in the content pane 320, the identified improper reference may be underlined within the text segment. In some implementations, a pop-up menu option 340 containing information about the identified improper reference is displayed. In an example, when the identified improper reference is underlined or highlighted, hovering over or clicking on the identified improper reference may result in displaying a UI element such as the UI element 340. The UI element 340 may include an indication 330 of the identified improper reference which may provide an explanation of the individuals' correct pronoun. Furthermore, the UI element 340 may provide an option for the user to automatically replace the improper reference by selecting (e.g., clicking on) the suggested reference 345. Alternatively, the user may be able to choose to provide feedback regarding the identified reference by selecting a "Not Ryan" UI element 350. As discussed above, selecting the ignore UI element 350 may result in disappearance of the UI element 340 as well as disappearance of the indication identifying the improper reference within the text. Furthermore, data about the user's selection of the suggested reference or "Not Ryan" may be collected and stored for use in ongoing training of the ML models used for identifying improper references and/or providing reference suggestions, as discussed above. In some implementations, explicit feedback is received from the user by utilizing the UI elements 355 or 360. The user may select the UI element 355 to indicate that the improper reference detection was useful to them or select the UI element 360 to signal that the identified improper reference was inaccurate or irrelevant. The received user feedback may be collected and used to provide ongoing training for the ML models discussed herein.

In some implementations, in addition to identifying an improper pronoun, improper or inaccurate titles may be detected. For example, as displayed in the GUI screen 300B of FIG. 3B, when the content includes a title, the title may be transmitted for review to the reference service. The reference service may utilize other information about the individual associated with the title to identify the individual. For example, the reference service may examine an email address in the "To" field of the email message to determine if the email address is associated with the individual and if so, whether the email address can help identify the individual. Once the individual is identified, information about the individual may be retrieved. For example, a database containing people's specified titles may be searched to locate the individual's desired title. If a specified title is not located, other information about the individual may be collected to determine if a title can be inferred. When a title is provided by the individual or is inferred, the title may be compared to the title used in the content to determine if a proper title is used. In some implementations, titles may also be used for consistency of tone. This may involve use of ML models and/or services that identify tone. If the tone of the content is determined as falling into a different category as that of the used title, then the title may also be identified as improper. For example, if the tone of the content is casual and a title of Mr. is used to refer to an individual, the title may be identified as improper because of inconsistency in tone.

When an improper title is detected, the improper title may be identified within the content by for example underlying the title. Furthermore, a UI element 340 may be displayed either automatically or by selecting the identified improper reference (e.g., by hovering over or clicking on). The UI element 340 may provide an explanation for the individuals' specified title, and include a UI element 365 (e.g., a link) for selecting a suggested replacement title. Additionally, the UI element may provide an option 350 for ignoring the identified improper reference and UI elements 355 and 360 for providing feedback.

Figure 4:
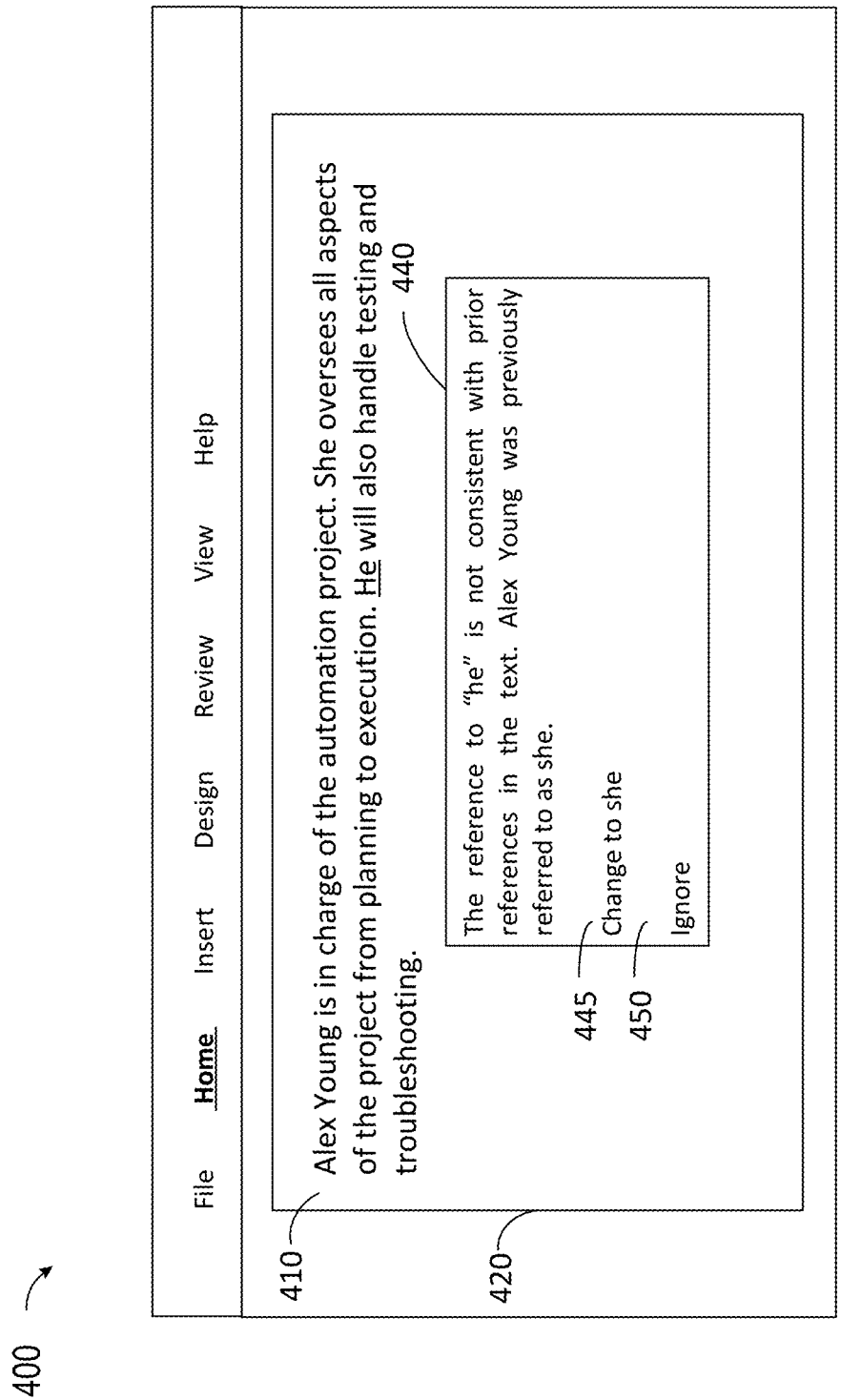
FIG. 4 an example GUI screen for detecting inconsistent use of references in content.

FIG. 4 is an example GUI screen for detecting inconsistent use of references in content. FIG. 4 is an example GUI screen 400 of a word processing application (e.g., Microsoft Word®) displaying an example document. GUI screen 400A may include a content pane 420 for displaying the content of the document. When a request for identifying improper references in a text segment such as the text segment 410 is received and/or when automatic improper reference identification is invoked, the reference service may identify improper references based on inconsistency. For example, when the pronoun she is used one or more times to refer to a person within the content of a document, and the next reference to that individual utilizes the pronoun he, the new pronoun may be identified as improper because it is inconsistent with previous references in the document. In the example of the text segment 410, the pronoun she is used to refer to Alex Young. In a subsequent sentence, the pronoun he is used to refer to the same person. This may result in identifying the he pronoun as improper.

Once a pronoun is identified as being improper, it may be identified within the content by for example use of underlining. In an example, the references with witch an identified improper pronoun is inconsistent may also be identified by using other identifying display features. For example, the she reference in the second sentence may be highlighted. In some implementations, hovering over and/or clicking on the identified improper reference may cause a UI element such as UI element 440 to be displayed. The UI element 440 may include an indication that identifies the improper reference, offers an explanation for why the reference was identified as improper and provides a suggested replacement reference 445. Furthermore, the UI element 440 may include a UI element 450 for ignoring the identified improper reference.

It should be noted that the applications providing improper reference identification and/or replacement suggestions may collect information from the document and/or the user as the user interacts with the content to better train the ML models used in providing improper reference identification and/or replacement suggestions. For example, the application may collect information relating to which one of the suggested replacement references was selected by the user. To ensure that context is taken into account, when using the information, the sentence structure and style may also be collected. Additionally, other information about the document and/or the user may be collected. For example, information about the type of document (e.g., word document, email, presentation document, etc.), the topic of the document, the position of the user within an organization (e.g., the user's job title or department to which the user belongs, if known), and other non-linguistic features such as the time of the day, the date, the device used, the person to whom the document is directed (e.g., the to line in an email), and the like may be collected and used to provide better suggestions. The user specific information may be used, in one implementation, to provide customized suggestions for the user. For example, if it is determined that the user uses specific language when writing to a particular person, this information may be used to provide suggested references (e.g., titles) the next time the user requests a reference check when writing to the same person.

Because contextual information (e.g., surrounding words) and user specific information may need to be collected in order to provide a context for learning and since this information and all other linguistic features may contain sensitive and private information, compliance with privacy and ethical guidelines and regulations is important. Thus, the collection and storage of user feedback may need to be protected against both maleficent attackers who might expose private data and accidental leakage by suggestions made to other users having learned from the data. As such, during the process of collecting and transmitting feedback information, the information may be anonymized and encrypted, such that any user-specific information is removed or encrypted to ensure privacy.

In one implementation, where user-specific information is used to provide customized replacement suggestions, any private user-specific information may be stored locally. In another example, information about users within an organization may be stored with the network of the organization. In such instances, information relating to institutional users may be collected and stored in compliance with the organization's own policies and standards to permit the development of organizational learning models. However, even within organizational networks, privacy may often need to be maintained to prevent unauthorized leakage of organizational secrets within the organization.

To ensure compliance with ethical and privacy guidelines and regulations, in one implementation, an optional UI element may be provided to inform the user of the types of data collected, the purposes for which the data may be used and/or to allow the user to prevent the collection and storage of user related data. The UI may be accessible as part of features provided for customizing an application via a GUI displayed by the application when the user selects an options menu button. Alternatively, the information may be presented in a user agreement presented to the user when he/she first installs the application.

It should also be noted that although the current disclosure discusses written contents, the same methods and systems can be utilized to provide improper reference identification for spoken words. For example, the methods discussed herein can be incorporated into or used with speech recognition algorithms to provide for improper reference identification and/or replacement suggestions for a spoken phrase. For example, when a speech recognition mechanism is used to convert spoken words to written words, the user may request improper reference identification and/or replacement suggestions for a spoken phrase. The spoken phrase may then be converted to a text segment before the text segment is examined and processed to provide improper reference identification and/or replacement suggestions. The detected improper reference and/or suggested replacement may then be spoken to the user.

Figure 5:
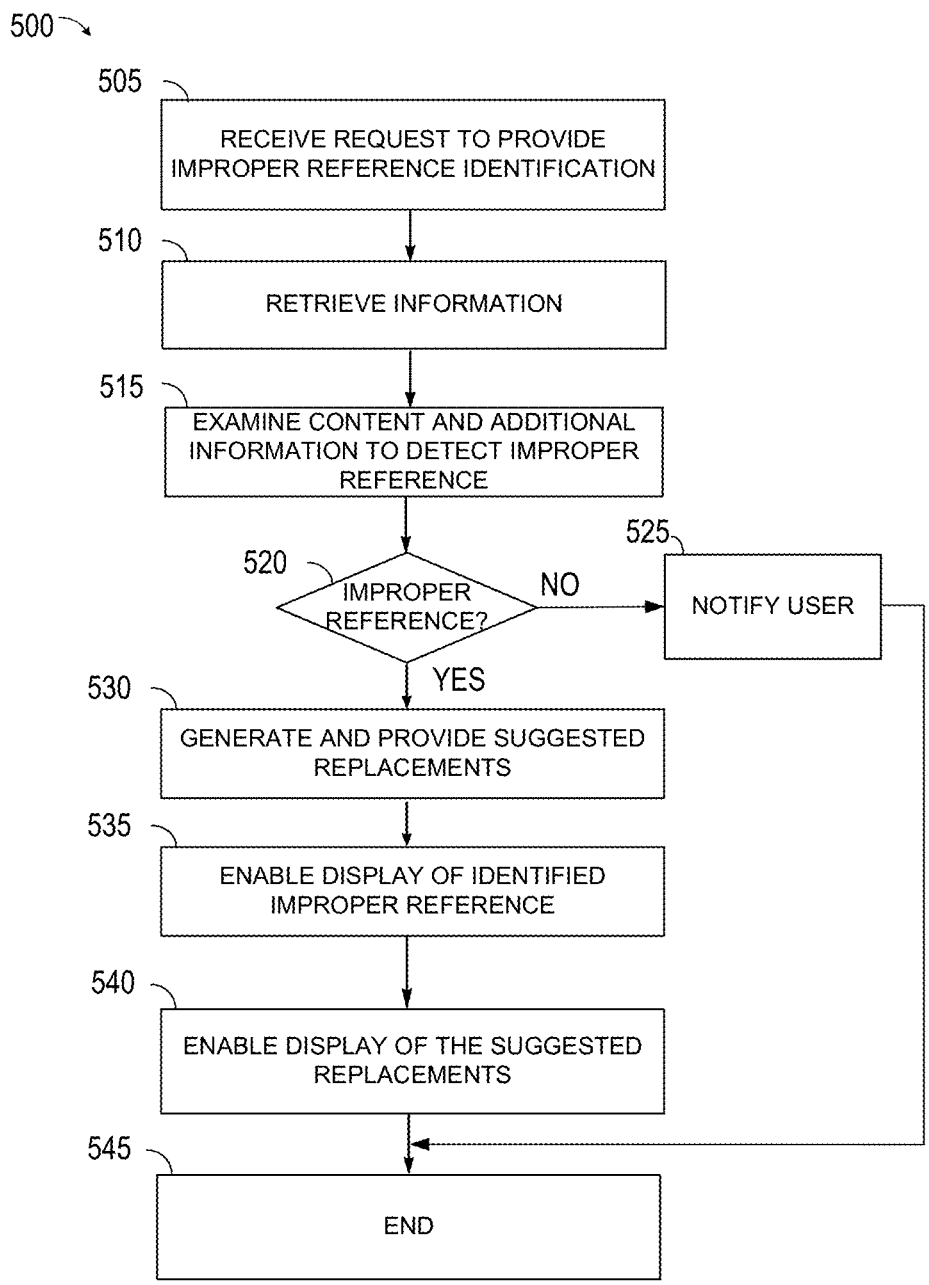
FIG. 5 is a flow diagram depicting an example method for providing intelligent improper reference detection and replacement suggestion.

FIG. 5 is a flow diagram depicting an exemplary method 500 for providing intelligent improper reference detection and replacement suggestion. One or more steps of the method 500 may be performed by a reference service and/or a people service such as the reference service and people service of FIGS. 1A-1B. At 505, method 500 may begin by receiving a request to provide improper reference identification for a given content segment. This may occur, for example, when the user utilizes an input/output device (e.g., a mouse) coupled to a computer client device to a select a text segment (e.g., a text string containing one or more words, icons, emoticons and the like) in a document displayed by the client device and proceeds to invoke a UI element to request that improper reference identification be provided for the selected text segment. In one implementation, a request may be received when a predetermined action takes place within the content pane (e.g., a special character is entered, or a predetermined keyboard shortcut is pressed), after a phrase within the contents has been selected. In some implementation, the request for improper reference identification may be issued from an application such as applications 112/126 without user action. For example, the application may determine that content should be checked for improper references because of the nature of the content being created (e.g., an important email). In such a case, the selected text segment may be the entire content or the text segment that the user recently finished creating (e.g., the latest sentence written).

Once a request to provide improper reference identification has been received, method 500 may proceed to retrieve information required to identify improper references, at 510. This may include retrieving contextual data, user history data, user profile data (e.g., a specified pronoun or title), other user's history data (e.g., the pronoun used by other users to refer to a person) and the like. In some implementation, the information includes other content from the document (e.g., the unselected portion of the content in the document) as well as the selected content portion. In other implementations, the selected content portion is provided with the request for improper reference detection.

After required information has been retrieved, method 500 may proceed to examine the content and additional information to detect improper references within the selected content, at 515. This may involve various steps discussed above with respect to FIGS. 1A-1B. For example, method 500 may first determine if the length of the selected text segment is appropriate for providing improper reference detection and if the selected text segment is too long, may employ a parsing engine to parse the segment into smaller segments. In an implementation, an appropriate size for the selected text segment may be one paragraph. Examining the selected text segment may also include determining if the selected text segment includes an identifiable word. This may include determining if the selected text segment includes words, numbers, and/or emoticons. For example, if the selected text segment consists of merely symbols (e.g., an equation), an error message may be provided indicating that the selected text segment is not appropriate for providing improper reference identification.

The content and additional information may be provided to one or more ML models for identifying improper references for the selected content. Method 500 may then proceed to determine, at 520, if an improper reference was identified within the content. When an improper reference is not identified (e.g., the content does not include any improper references), method 500 may proceed to notify the user, at 525, before proceeding to end, at 545. This may involve transmitting an indication to the application which may in turn display a notification to the user that no improper references were identified in the selected content. When the user did not make an explicit request for improper reference identification (e.g., when the request is submitted automatically without user action), a notification may not be provided, at 525. Instead, method 500 may simply proceed to end, at 545.

When an improper reference is identified (yes at 520), method 500 may proceed to generate and provide suggested replacement references for the identified improper reference, at 530. This may be achieved by utilizing one or more ML models, as discussed above. Method 500 may then proceed to enable display of the identified improper reference, at 535. This may involve transmitting the identified improper reference to the application for display.

Method 500 may also enable display of the suggested replacement references, at 540. Enabling the display may include transmitting the identified suggestions to the local application running on the user's client device which may utilize one or more UI elements such as those discussed above to display the suggested replacements on a display device associated with the client device. The format in which the suggestions are displayed may vary. However, in most cases, the suggestions may be displayed alongside the contents to enable easy reference to the contents. Once the suggestions are displayed, method 500 may proceed to end at 545.

Figure 6:
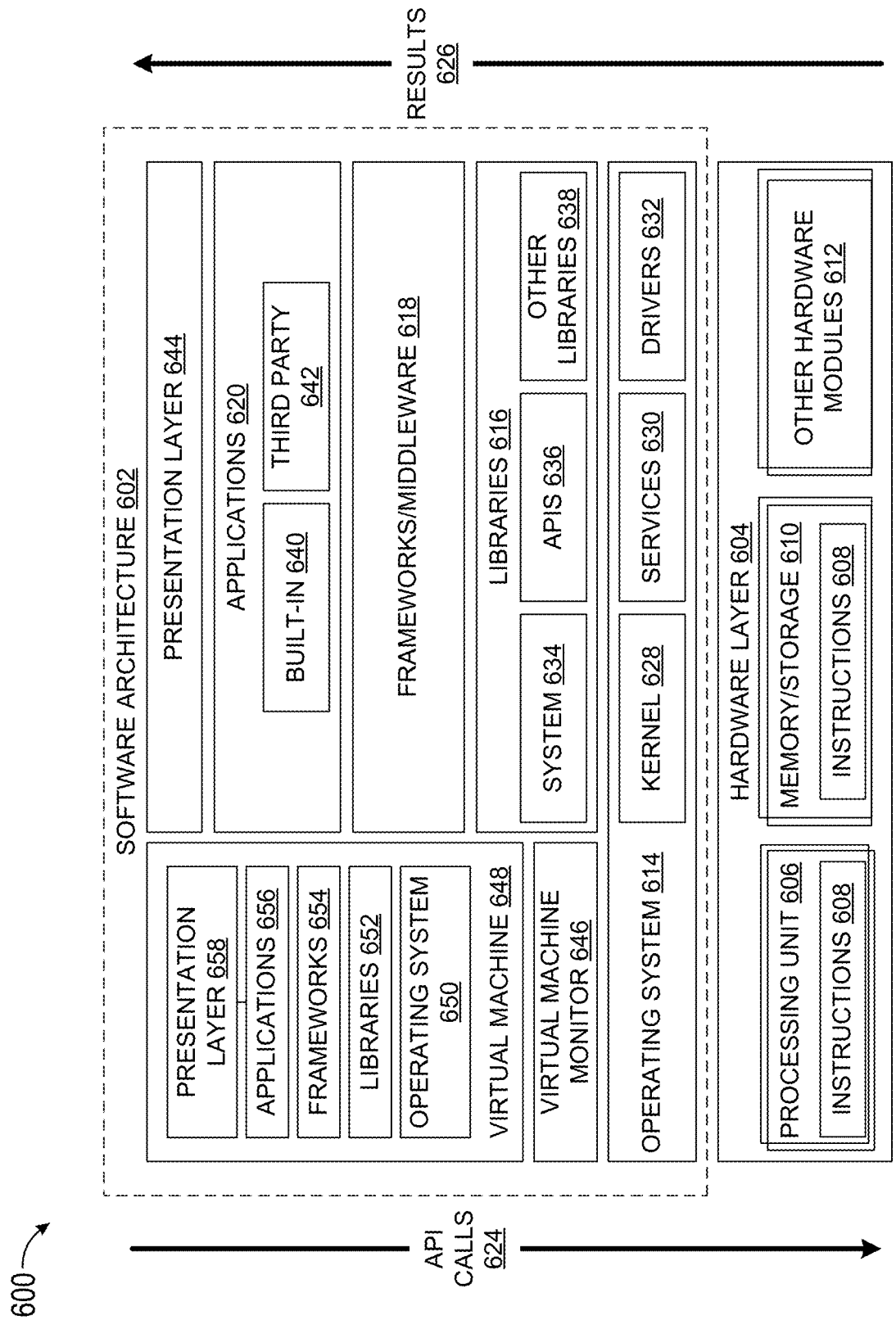
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 646 which manages operation of the virtual machine 628 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
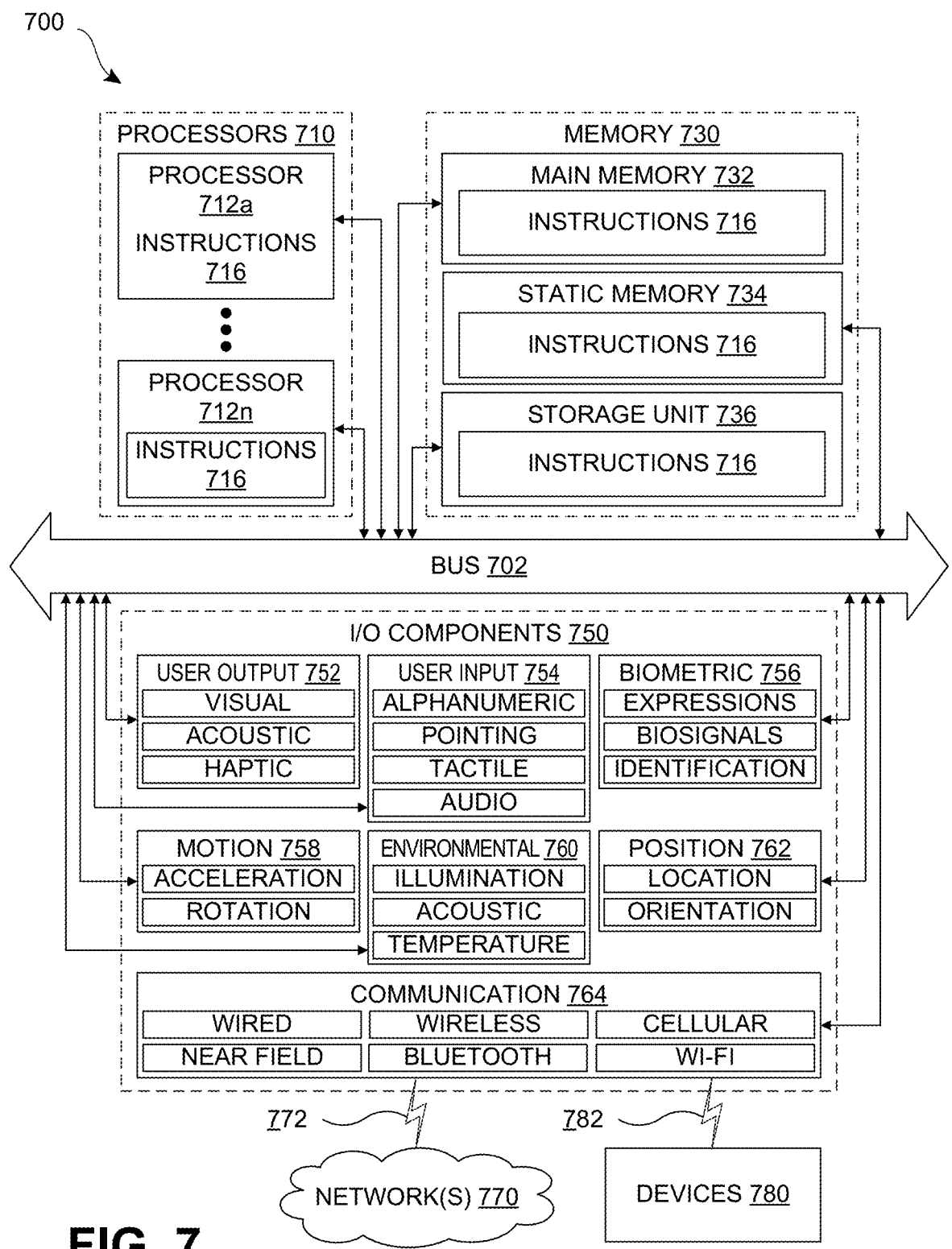
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by, the processor, cause the data processing system to perform functions of:
receiving a request to identify an improper reference in a content segment; inputting the content segment into a machine-learning (ML) model to identify the improper reference in the content segment;

obtaining the identified improper reference as a first output from the ML model; obtaining one or more suggested replacement references as a second output from the ML model; and providing at least one of the identified improper reference or the at least one of the one or more suggested replacements for display.

Item 2. The data processing system of item 1, wherein the instructions further cause the processor to cause the data processing system to perform functions of:

receiving an input indicating a user's selection of the at least one of the one or more suggested replacements; and upon receiving the input, replacing the identified improper reference in the content segment with the selected suggested replacement.

Item 3. The data processing system of item 2, wherein the instructions further cause the processor to cause the data processing system to perform functions of:

collecting user feedback information relating to the user's selection of the suggested replacement;

ensuring that the user feedback information is privacy compliant; and storing the user feedback information for use in improving the ML model.

Item 4. The data processing system of any preceding item, wherein providing the at least one of the identified improper reference or the at least one of the one or more suggested replacements for display includes displaying the at least one of the identified improper reference or the at least one of the one or more suggested replacements on a user interface element which is displayed within a content pane.

Item 5. The data processing system of any preceding item, wherein an improper reference includes at least one of an ambiguous reference, an inconsistent reference, a reference having an improper tone or an incorrect pronoun.

Item 6. The data processing system of any preceding item, wherein the instructions further cause the processor to cause the data processing system to perform functions of:

determining that the content segment includes a reference, the reference being a pronoun;

identifying a person to whom the pronoun refers;

identifying an appropriate pronoun for the person;

comparing the pronoun to the appropriate pronoun to determine if the pronoun is improper; and upon determining that the pronoun is improper, identifying the reference as improper.

Item 7. The data processing system of item 6, wherein identifying an appropriate pronoun for the person includes determining if the person has indicated a correct pronoun.

Item 8. A method for providing improper reference identification for a content segment, comprising:

receiving a request to identify an improper reference in the content segment;

inputting the content segment into a machine-learning (ML) model to identify the improper reference in the content segment;

obtaining the identified improper reference as a first output from the ML model;

obtaining one or more suggested replacement references as a second output from the ML model; and providing at least one of the identified improper reference or the at least one of the one or more suggested replacements for display.

Item 9. The method of item 8, further comprising:

receiving an input indicating a user's selection of the at least one of the one or more suggested replacements; and upon receiving the input, replacing the identified improper reference in the content segment with the selected suggested replacement.

Item 10. The method of item 9, further comprising:

collecting user feedback information relating to the user's selection of the suggested replacement;

ensuring that the user feedback information is privacy compliant; and storing the user feedback information for use in improving the ML model.

Item 11. The method of any of items 8-10, wherein providing the at least one of the identified improper reference or the at least one of the one or more suggested replacements for display includes displaying the at least one of the identified improper reference or the at least one of the one or more suggested replacements on a user interface element which is displayed within a content pane.

Item 12. The method of any of items 8-11, wherein an improper reference includes at least one of an ambiguous reference, an inconsistent reference, a reference having an improper tone or an incorrect pronoun.

Item 13. The method of any of items 8-12, further comprising:

determining that the content segment includes a reference, the reference being a pronoun;

identifying a person to whom the pronoun refers;

identifying an appropriate pronoun for the person;

comparing the pronoun to the appropriate pronoun to determine if the pronoun is improper; and upon determining that the pronoun is improper, identifying the reference as improper.

Item 14. The method of item 13, wherein identifying an appropriate pronoun for the person includes determining if the person has indicated a correct pronoun.

Item 15. A non-transitory computer readable medium on which are stored instructions that, when executed, cause a programmable device to:

receive a request to identify an improper reference in a content segment;

input the content segment into a machine-learning (ML) model to identify the improper reference in the content segment;

obtain the identified improper reference as a first output from the ML model;

obtain one or more suggested replacement references as a second output from the ML model; and provide at least one of the identified improper reference or the at least one of the one or more suggested replacements for display.

Item 16. The non-transitory computer readable medium of item 15, wherein the instructions further cause the programmable device to:

receive an input indicating a user's selection of the at least one of the one or more suggested replacements; and upon receiving the input, replace the identified improper reference in the content segment with the selected suggested replacement.

Item 17. The non-transitory computer readable medium of item 16, wherein the instructions further cause the programmable device to:

collecting user feedback information relating to the user's selection of the suggested replacement;

ensuring that the user feedback information is privacy compliant; and storing the user feedback information for use in improving the ML model.

Item 18. The non-transitory computer readable medium of any of items 15-17, wherein an improper reference includes at least one of an ambiguous reference, an inconsistent reference, a reference having an improper tone or an incorrect pronoun.

Item 19. The non-transitory computer readable medium of any of items 15-18, wherein the instructions further cause the programmable device to:
  determine that the content segment includes a reference, the reference being a pronoun;
  identify a person to whom the pronoun refers;
  identify an appropriate pronoun for the person;
  compare the pronoun to the appropriate pronoun to determine if the pronoun is improper; and
  upon determining that the pronoun is improper, identify the reference as improper.

Item 20. The non-transitory computer readable medium of item 19, wherein identifying an appropriate pronoun for the person includes determining if the person has indicated a correct pronoun.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
  a processor; and
  a memory in communication with the processor, the memory comprising executable instructions that, when executed by, the processor, cause the data processing system to perform functions of:
  receiving a request to identify an improper reference in a content segment;
  inputting the content segment into one of a plurality of trained improper reference detection machine-learning (ML) models, each of the plurality of trained improper reference detection ML models being trained using a pretrained natural processing model for identifying an improper reference in the content segment;
  obtaining the identified improper reference and a confidence score associated with the identified improper reference as outputs from the one of the plurality of trained improper reference detection ML models;
  determining, based on the confidence score, that the identified improper reference should be provided for display;
  providing the identified improper reference to a trained reference suggestion model, the trained reference suggestion model being trained for providing one or more suggestions for replacing the identified improper reference with a proper reference;
  obtaining one or more suggested replacement references as an output from the trained reference suggestion model; and
  providing at least one of the identified improper reference or the at least one of the one or more suggested replacement references for display,
  wherein providing the at least one of the identified improper reference or the at least one of the one or more suggested replacements for display includes:
    displaying a user interface (UI) element on a UI screen on which the content segment is displayed, the UI element displaying a notification of the identified improper reference; and
    displaying a selectable UI element that presents at least one of the one or more suggested replacement references for selection.

2. The data processing system of claim 1, wherein the instructions further cause the processor to cause the data processing system to perform functions of:
   receiving, via the selectable UI element, an input indicating a user's selection of the selectable UI element; and
   upon receiving the input, automatically replacing the identified improper reference in the content segment with the at least one of the one or more suggested replacement references.

3. The data processing system of claim 2, wherein the instructions further cause the processor to cause the data processing system to perform functions of:
   collecting user feedback information relating to a selection of the suggested replacement reference;
   ensuring that the user feedback information is privacy compliant; and
   storing the user feedback information for use in improving the ML model.

4. The data processing system of claim 1, wherein an improper reference includes at least one of an ambiguous reference, an inconsistent reference, a reference having an improper tone or an incorrect pronoun.

5. The data processing system of claim 1, wherein the instructions further cause the processor to cause the data processing system to perform functions of:
   determining that the content segment includes a reference, the reference being a pronoun;
   identifying a person to whom the pronoun refers;
   identifying an appropriate pronoun for the person;
   comparing the pronoun to the appropriate pronoun to determine that the pronoun is improper; and
   upon determining that the pronoun is improper, identifying the reference as improper.

6. The data processing system of claim 5, wherein identifying an appropriate pronoun for the person includes determining that the person has indicated a correct pronoun.

7. The data processing system of claim 1, wherein providing the at least one of the identified improper reference or the at least one of the one or more suggested replacements for display further includes displaying a selectable feedback UI element for receiving explicit feedback regarding at least one of the identified improper reference or the one or more suggested replacements; and upon selection of the selectable feedback UI element, collecting the explicit feedback for use in training at least one of the improper reference detection ML models or the reference suggestion ML model.

8. A method for providing improper reference identification for a content segment, comprising:
   receiving a request to identify an improper reference in the content segment;
   inputting the content segment into one of a plurality of trained improper reference detection machine-learning (ML) models, each of the plurality of trained improper reference detection ML models being trained using a pretrained natural processing model for identifying a type of an improper reference in the content segment;
   obtaining the identified improper reference and a confidence score associated with the identified improper reference as outputs from the one of the plurality of trained improper reference detection ML models;
   determining, based on the confidence score, that the identified improper reference should be provided for display;
   providing the identified improper reference to a trained reference suggestion model, the trained reference suggestion model being trained for providing one or more suggestions for replacing the identified improper reference with a proper reference;
   obtaining one or more suggested replacement references as an output from the trained reference suggestion model; and
   providing at least one of the identified improper reference or the at least one of the one or more suggested replacement references for display,
   wherein providing the at least one of the identified improper reference or the at least one of the one or more suggested replacements for display includes:
      displaying a user interface (UI) element on a UI screen on which the content segment is displayed, the UI element displaying a notification of the identified improper reference; and
      displaying a selectable UI element that presents at least one of the one or more suggested replacement references for selection.

9. The method of claim 8, further comprising:
   receiving, via the selectable UI element, an input indicating a user's selection of the selectable UI element; and
   upon receiving the input, automatically replacing the identified improper reference in the content segment with the at least one of the one or more suggested replacement references.

10. The method of claim 9, further comprising:
   collecting user feedback information relating to a selection of the suggested replacement reference;
   ensuring that the user feedback information is privacy compliant; and
   storing the user feedback information for use in improving the ML model.

11. The method of claim 8, wherein an improper reference includes at least one of an ambiguous reference, an inconsistent reference, a reference having an improper tone or an incorrect pronoun.

12. The method of claim 8, further comprising:
   determining that the content segment includes a reference, the reference being a pronoun;
   identifying a person to whom the pronoun refers;
   identifying an appropriate pronoun for the person;
   comparing the pronoun to the appropriate pronoun to determine that the pronoun is improper; and
   upon determining that the pronoun is improper, identifying the reference as improper.

13. The method of claim 12, wherein identifying an appropriate pronoun for the person includes determining that the person has indicated a correct pronoun.

14. A non-transitory computer readable medium on which are stored instructions that, when executed, cause a programmable device to:
   receive a request to identify an improper reference in a content segment;
   input the content segment into one of a plurality of trained improper reference detection machine-learning (ML) models, each of the plurality of trained improper reference detection ML models being trained using a pretrained natural processing model for identifying an improper reference in the content segment;
   obtain the identified improper reference and a confidence score associated with the identified improper reference as outputs from the one of the plurality of trained improper reference detection ML models;
   determine, based on the confidence score, that the identified improper reference should be provided for display;

provide the identified improper reference to a trained reference suggestion model, the trained reference suggestion model being trained for providing one or more suggestions for replacing the identified improper reference with a proper reference;

obtain one or more suggested replacement references as an output from the trained reference suggestion model; and provide at least one of the identified improper reference or the at least one of the one or more suggested replacement references for display, wherein providing the at least one of the identified improper reference or the at least one of the one or more suggested replacements for display includes:

displaying a user interface (UI) element on a UI screen on which the content segment is displayed, the UI element displaying a notification of the identified improper reference; and displaying a selectable UI element that presents at least one of the one or more suggested replacement references for selection.

15. The non-transitory computer readable medium of claim 14, wherein the instructions further cause the programmable device to:

receive, via the selectable UI element, an input indicating a user's selection of the selectable UI element; and upon receiving the input, automatically replace the identified improper reference in the content segment with the at least one of the one or more suggested replacement references.

16. The non-transitory computer readable medium of claim 15, wherein the instructions further cause the programmable device to:

collect user feedback information relating to a selection of the suggested replacement reference;

ensure that the user feedback information is privacy compliant; and store the user feedback information for use in improving the ML model.

17. The non-transitory computer readable medium of claim 14, wherein an improper reference includes at least one of an ambiguous reference, an inconsistent reference, a reference having an improper tone or an incorrect pronoun.

18. The non-transitory computer readable medium of claim 14, wherein the instructions further cause the programmable device to:

determine that the content segment includes a reference, the reference being a pronoun;

identify a person to whom the pronoun refers;

identify an appropriate pronoun for the person;

compare the pronoun to the appropriate pronoun to determine that the pronoun is improper; and upon determining that the pronoun is improper, identify the reference as improper.

19. The non-transitory computer readable medium of claim 18, wherein identifying an appropriate pronoun for the person includes determining that the person has indicated a correct pronoun.

* * * * *